(12) United States Patent
Denny et al.

(10) Patent No.: US 6,448,719 B2
(45) Date of Patent: Sep. 10, 2002

(54) APPARATUS AND METHOD FOR PULSATING LIGHTS IN RESPONSE TO AN AUDIO SIGNAL

(76) Inventors: Jeffrey G. Denny, 11589 Cypress Canyon Park Dr., San Diego, CA (US) 92131; Steven D. Karnes, 28306 Gitano, Mission Viejo, CA (US) 92692

( * ) Notice: Subject to any disclaimer, the term of this patent is extended or adjusted under 35 U.S.C. 154(b) by 0 days.

(21) Appl. No.: 09/877,555

(22) Filed: Jun. 8, 2001

Related U.S. Application Data

(60) Provisional application No. 60/210,727, filed on Jun. 9, 2000.

(51) Int. Cl.[7] ............................. A61B 1/26; G10L 9/04
(52) U.S. Cl. .................... 315/200 A; 315/312; 381/28
(58) Field of Search ......................... 315/291–296, 315/312, 316, 318, 320, 324, 149–159, 185 R, 241 S, 200 A; 381/28, 49

(56) References Cited

U.S. PATENT DOCUMENTS

| | | | |
|---|---|---|---|
| 4,000,679 A | 1/1977 | Norman | 84/464 |
| 4,125,781 A | 11/1978 | Davis | 307/11 |
| 4,807,291 A * | 2/1989 | Hoffmann et al. | 381/49 |
| 5,121,435 A | 6/1992 | Chen | 381/56 |
| 6,198,229 B1 * | 3/2001 | McCloud et al. | 315/200 A |

* cited by examiner

*Primary Examiner*—Don Wong
*Assistant Examiner*—Wilson Lee
(74) *Attorney, Agent, or Firm*—Robert E. Howard

(57) ABSTRACT

An acoustical control apparatus for regulating voltage flow in response to an audio signal. The apparatus includes a power supply, a level control network, a multiple active filter network, a phase control network, a comparator network and output control network. The apparatus separates the audio signal into distinct frequency bandwidths and regulates the intensity of voltage flow from and in synchronization with the power supply. The distinct bandwidths and intensity control of the voltage feed triac drivers to allow pulsating voltage to flow to a plurality of lighting circuits. The lighting circuits pulsate to the beat of the audio signal.

17 Claims, 5 Drawing Sheets

APPARATUS AND METHOD FOR PULSATING LIGHTS IN RESPONSE TO AN AUDIO SIGNAL

CROSS-REFERENCE TO RELATED APPLICATIONS

This application claims the benefit of U.S. Provisional Application No. 60/210,727, filed Jun. 9, 2000, the entire disclosure of which is hereby incorporated by reference.

BACKGROUND OF THE INVENTION

The present invention relates to an acoustic control apparatus and method for causing lights to pulsate to the beat of an audio signal. More particularly, the present invention relates to an acoustic control circuit and method preferably used to cause multiple strings of Christmas tree lights to pulsate to the beat of an audio signal.

U.S. Pat. No. 4,125,781 describes a lighting control apparatus for Christmas tree lighting having at least four duty cycle outputs, the duty cycle pattern of each output differs with respect to a predetermined time interval from the duty cycle pattern of each of the other outputs of the control. This produces in a number of Christmas tree lighting strings connected to the output of the control a coordinated condition of continuously changing light intensities between strings that occur in a predetermined sequential time differing order. The Christmas tree lighting varies individually in light output intensity and in a predetermined time differing and coordinated sequence to effect an overall light intensity output from the tree. The light intensity remains substantially constant during the intensity changes to produce a shimmering of all tree lights.

U.S. Pat. No. 5,121,435 describes an acoustic control circuit that sequences the flashing of Christmas tree lights according to the rhythm and volume of a sound. This is accomplished through a flash control circuit that makes use of externally produced acoustic intensity to affect the sequencing of flashing in accordance to a predetermined sequence. Christmas tree lights are driven to flash one after another in proper sequence by means of the control of the external sound source or internal signal source. A comparator to provide a control signal proportional to the external sound source processes the amplified sound signal. After passing through a control selector, the control signal is sent to a divider to further trigger four separate series of lights in a proper sequence.

A problem associated with such prior acoustic control apparatuses are that Christmas tree lights and other lighting displays are either constantly on all of the time, or they twinkle at a predetermined and sequenced interval. This visual effect is monotonous, aesthetically dull, lacking luster, and visual stimulation is absent.

The present invention will enable a user to listen to their favorite music, or view their favorite show on television, and simultaneously watch their holiday lights pulsate to the audio signal they are listening to. The invention will add a new visual stimulation to the traditional holiday experience, making it fun and enjoyable to look at lights enriching the holiday experience.

SUMMARY OF THE INVENTION

The present invention provides an acoustic control apparatus for regulating output voltage and phase for each channel output, and in synchronization with a power source by importing audio signals and separating amplified audio signals into distinct pre-established bandwidths, amplifying the distinct bandwidths into signals that control each channel's voltage and phase, and then exporting that signal into each channels' output. This acoustic control apparatus includes a power supply, level control, multiple active filters, phase control, comparators and output control. A power source is connected among the level control, multiple active filters, phase control, comparators, and output control thereby pulsating the voltage output.

These and other aspects of the invention will become apparent from the following description, the description being used to illustrate the preferred embodiment of the invention when read in conjunction with the accompanying drawings.

BRIEF DESCRIPTION OF THE DRAWINGS

FIG. 2B*b* is the electronic schematic of FIG. 2B without the opto couplers and associated parts.

DETAILED DESCRIPTION OF THE INVENTION

While the present invention is described below with reference to Christmas tree lights, the principles of the present invention are applicable to other applications. For example, the apparatus can be used to control all forms and applications of incandescent lighting such as those used at concerts, automobiles, nightclubs, bars, store window fronts, restaurants and other forms of display lighting.

Figure 1:
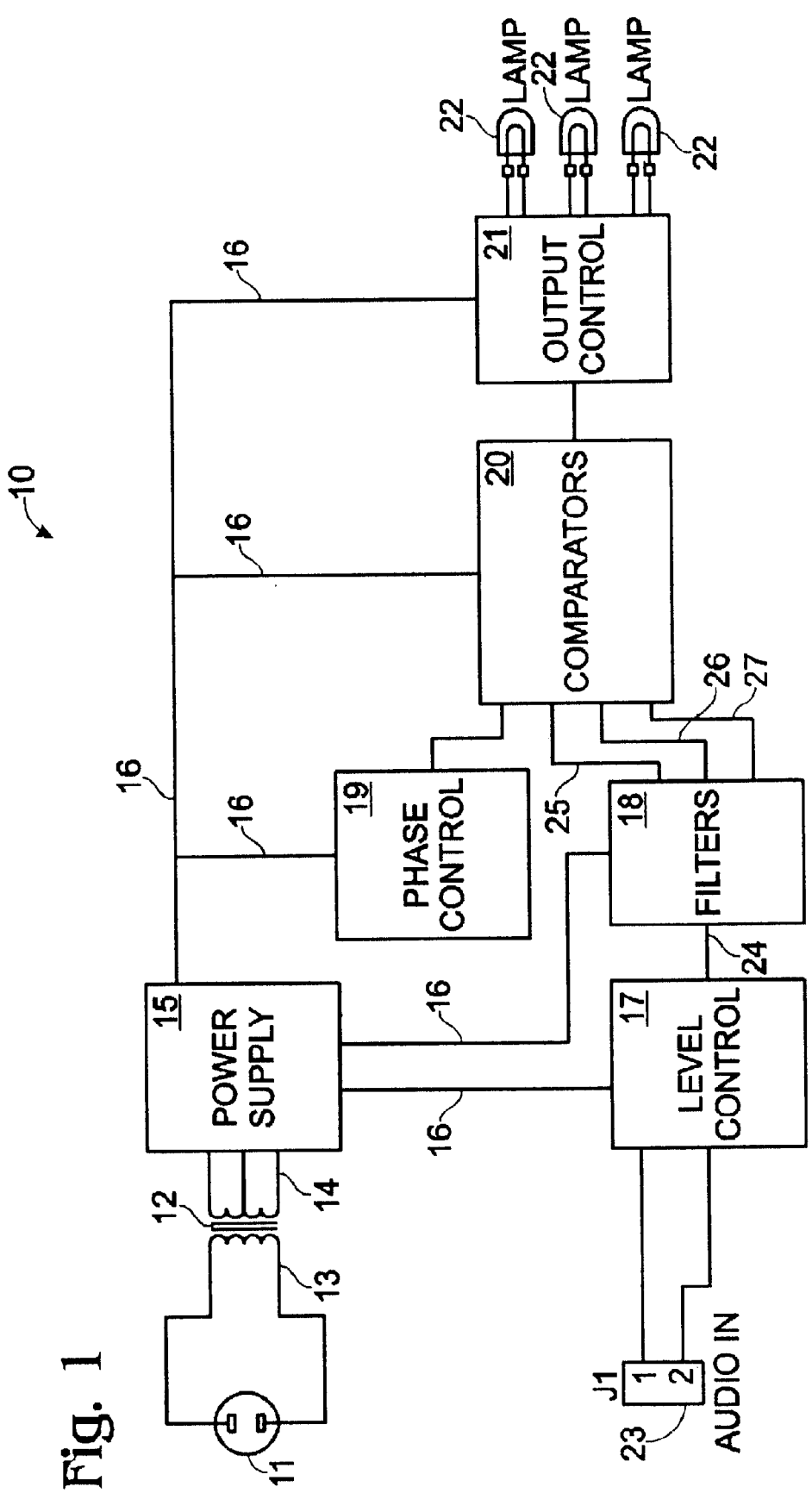
FIG. 1 is a composite block diagram representing the preferred embodiment of the invention.

With reference to FIG. 1, the acoustic control apparatus 10 is supplied with AC power through a male AC plug 11 and carried to transformer 12 converting 110 volt AC power 13 to a low voltage AC power 14. The low voltage AC power 14 feeds the power supply circuitry 15 that provides operating voltages 16 of +5VDC and −5VDC for the acoustic control apparatus 10. The power supply 15 may be a fully self-contained power module or individual components. The low voltage DC power 16 is distributed throughout the acoustic control apparatus 10. The low voltage DC power 16 is supplied to the level control network 17, the multiple active filters network 18, the phase control network 19, the comparator network 20, and the output control network 21, which is the triac of the apparatus 10 and is an opto triac driver as depicted in FIG. 2B.

As shown in FIG. 1, the acoustic control apparatus 10 receives an audio signal 23. The audio signal 23 may be from any source, such as a stereo, television, radio, boom box, computer, microphone, DVD player or any other audio signal producing apparatus. The audio signal 23 is imported into the apparatus 10 via a suitable connection, such as a single (mono) RCA type jack, or standard speaker wire positive/negative type input connector.

As shown in FIG. 1, the level control network 17 receives the audio signal 23 in order to amplify the signal to a usable level. The level control network 17 may be either fixed or manually controlled. The amplified audio signal 24 becomes the driver of the individual lighting circuits 22 through the apparatus 10. Additionally, the level control network 17 may be controlled digitally, microprocessor controlled, controlled by the use of a programmable interface chip (PIC), or controlled by other devices such as an analog signal interface chip (ASIC). The amplified signal 24 feeds the active filter network 18.

The active filter network 18, as can be seen in FIG. 1, takes the amplified audio signal 24 and separates it into a multitude of distinct frequency bandwidths within the audio signal spectrum such as high bandwidth 27 (which is preferably between about 960 Hz–15,360 Hz), medium bandwidth 26 (which is preferably between about 240 Hz–960 Hz), and low bandwidth 25 (which is preferably between about 60 Hz–240 Hz). The active filter network 18 also has the ability to separate the amplified audio signal 24 into more than three frequency bandwidths having as many distinct frequency bandwidths as desired by selecting the appropriate active bandpass filter. The active filter network 18 separates the amplified audio signal 24 by the difference in the value of the resistance and capacitance. Providing different values of resistance and capacitance produces different distinct frequency bandwidths. Additionally, the active filter network 18 may be controlled digitally, microprocessor controlled, controlled by the use of a programmable interface chip (PIC), or controlled by other devices such as an analog signal interface chip (ASIC).

The output from the active multiple filters network 18 are fed into load resistance pots that enables the user to control the level of intensity of the lights associated with each distinct frequency bandwidth. The distinct bandwidths high 27, medium 26 and low 25 signals are fed into separate load resistance pots. Consequently, there can be multiple signal levels based on the number of individual channels that the apparatus has in operation. These pots are used for the sensitivity control of the apparatus 10 to adjust the intensity level of each individual channel. The lighting circuit 22 will have an intensity proportionate to the magnitude of energy contained in the active multiple filter network 18 supplying the distinct bandwidth high 27, medium 26 and low 25 signal to the respective comparators in the comparator network 20.

A master control relay may be incorporated into the active multiple filters network 18 to interact and act as a bandwidth override with the intensity control for each distinct bandwidth high 27, medium 26 and low 25 signal. The individual controls allow the user to adjust and set each bandwidth to a selected intensity level. The master control may then be used to adjust each bandwidth selected intensity level simultaneously so the user will not have to readjust the level settings preset for each bandwidth while using the apparatus. Consequently, the intensity level for each bandwidth can be adjusted individually or preset at a desired level, and together with the master control can be used to operate the bandwidths so all of the intensity levels are changed at the same time and at the intensity levels currently being utilized, both with positive and negative gain in the intensity level of the lights.

A phase control network 19 sends a signal to the respective comparators in the comparator network 20. This allows the triacs on the comparator network 20 to switch at 60 CPS. Additionally, the phase control network 19 may be controlled digitally, microprocessor controlled, controlled by use of a programmable interface chip (PIC), or controlled by other devices such as an analog signal interface chip (ASIC).

The comparator network 20, as shown in FIG. 1, receives energy intensity proportionate to the magnitude of energy contained in the active multiple filter network 18 for each distinct bandwidth high 27, medium 26 and low 25 signal for each respective comparator from load resistance pots. Also, the comparator network is furnished input from the phase control network 19. The comparators change state each time the input signal crosses the phase control threshold. The output from the comparators is fed to an opto triac driver, as shown in FIG. 2B. The triac drivers drive the control gates of the triacs each time the comparators switch. Consequently, the triacs allow current to flow through the lighting circuits 22. The lighting circuits will have intensity proportionate to the magnitude of energy contained in the active multiple filters 18 for supplying distinct bandwidth high 27, medium 26 and low 25 signals for each respective comparator in the comparator network 20. Additionally, comparator 20 may be controlled digitally, microprocessor controlled, controlled by the use of a programmable interface chip (PIC), or controlled by other devices such as an analog signal interface chip (ASIC).

In FIG. 1, the output control 21 amplifies the current at each distinct bandwidth to enable each bandwidth to power multiple lighting circuits 22.

Once the distinct bandwidths are amplified, a control signal is then sent to the output control network 21 that drives the outlets where the lighting circuits 22 are plugged into.

Figure 2A:
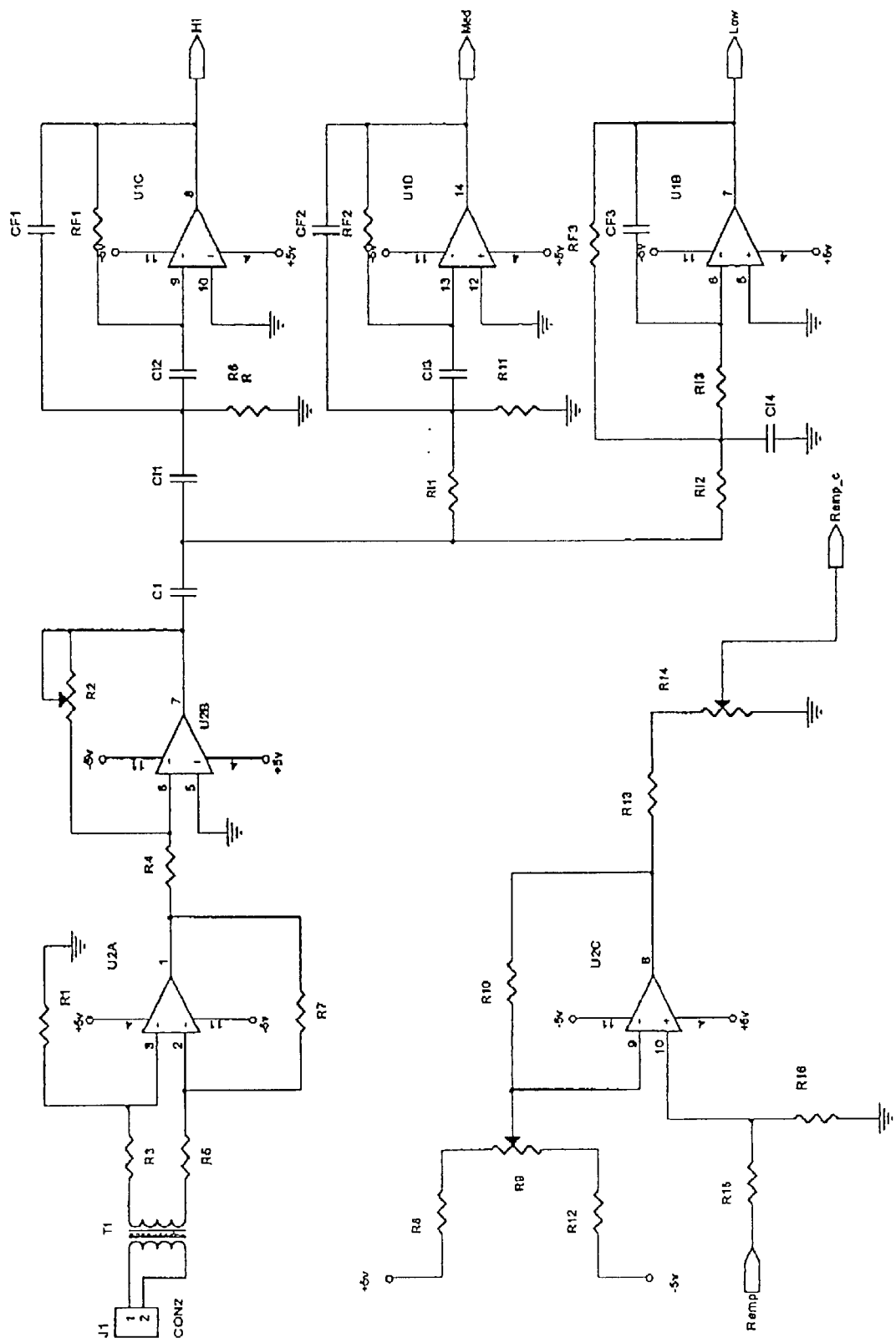
FIG. 2A is an electronic schematic of the multiple active filter network representing the preferred embodiment of the invention.
Figure 2B:
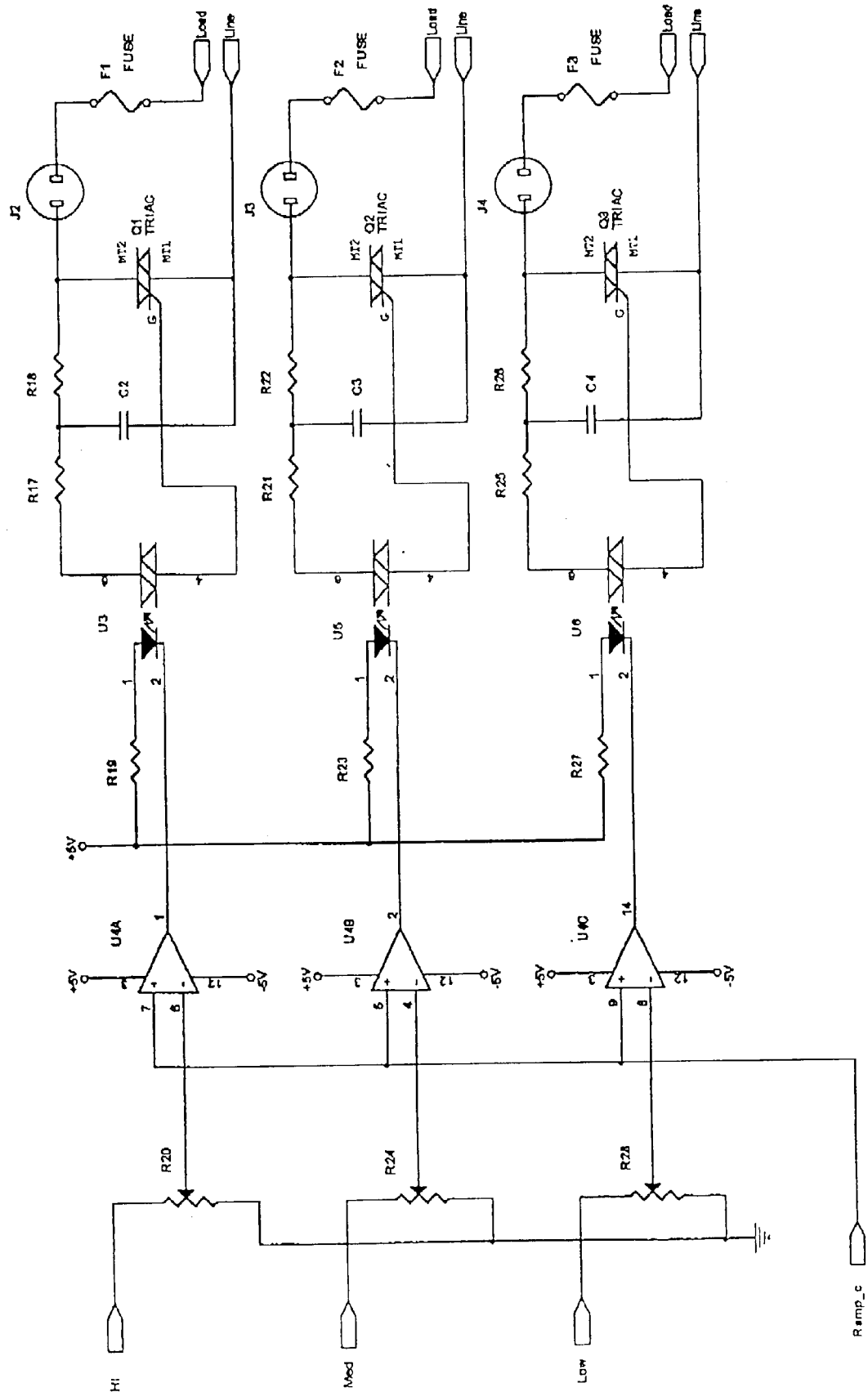
FIG. 2B is an electronic schematic of the comparators and output control representing the preferred embodiment of the invention.
Figure 2B:
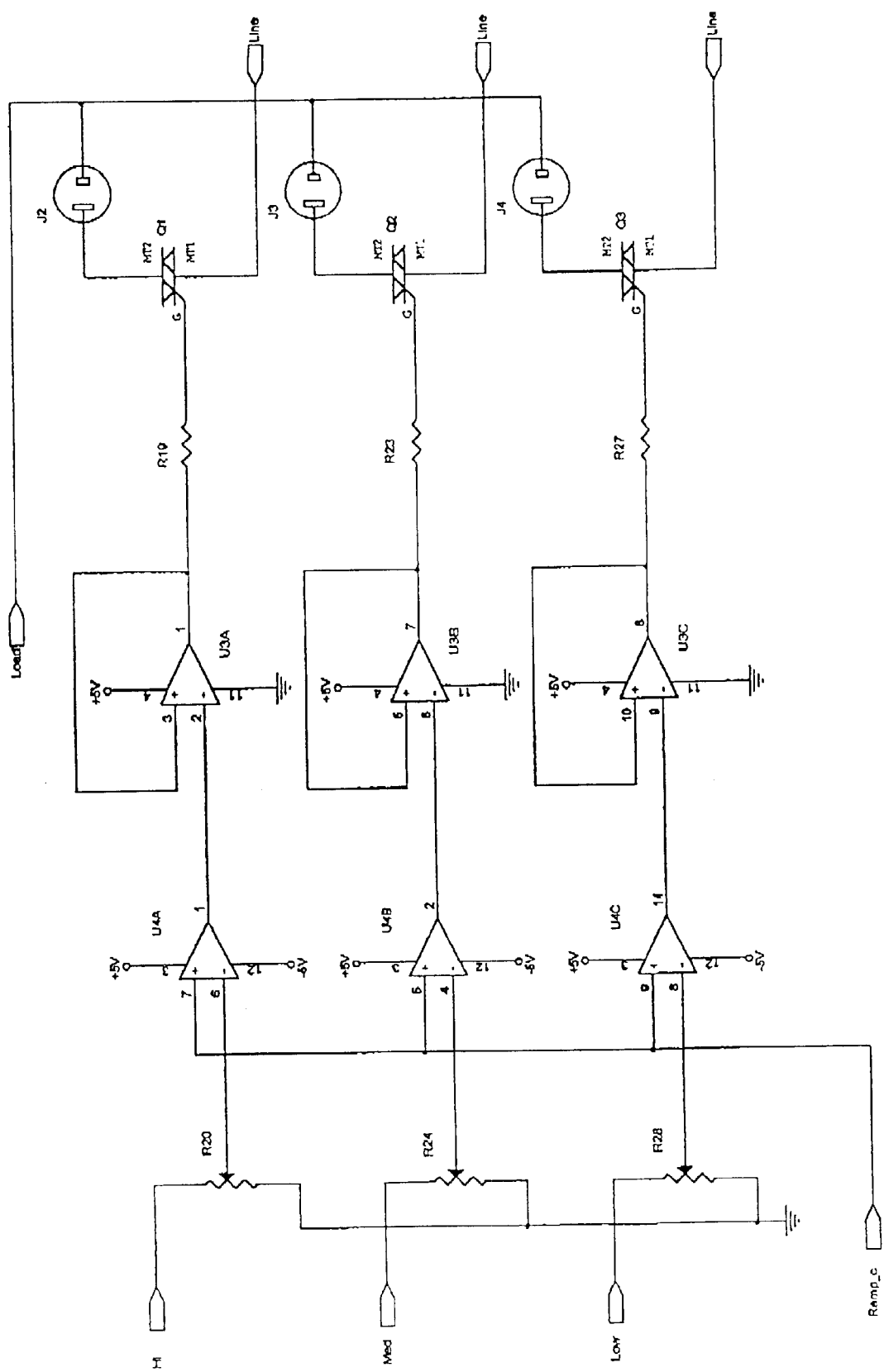

In FIG. 2A, a first section of the active filter network 18 receives its input signals from a first filter U2A and a second filter U2B into a band pass filter consisting of filter U1D, resistor RI1 capacitor CI3, capacitor CF2 and resistor RF2. This section of active bandpass filter will pass a mid-range of frequencies.

A second section of the active filter network 18 receives its input signals from a first filter U2A and a second filter U2B into a band pass filter consisting of filter U1C, resistor RI4, resistor R6, capacitor CI2, capacitor CF1 and resistor RF1. This section of active bandpass filter will pass a high range of frequencies.

A third section of the active filter network 18 receives its input signals from a first filter U2A and a second filter U2B into a band pass filter consisting of filter U1B, resistor RI2, resistor RI3, capacitor CI4 capacitor CF3 and resistor RF3. This section of active bandpass filter will pass a low range of frequencies.

The foregoing sections of the active filter network 18 can be duplicated to provide for one or more additional bandwidths, or one of the sections omitted to provide for only two bandwidths. However, three bandwidths are preferred.

Filter U2C and associated circuitry shown in FIG. 2A provides the phase control for the comparator network 20 in FIG. 1 at 60 CPS.

Referring now to FIG. 2B, the high, medium and low bandwidth outputs of the active filter network 18 are fed into load resistance pot R20, load resistance pot R24 and load resistance pot R28, respectively. These pots are used for the sensitivity control of the apparatus to select the intensity level of each individual lighting circuit 22 in FIG. 1 for a given level of input signal.

The output from resistance pot R20 is fed to comparator U4A. The output from resistance pot R24 is fed to comparator U4B. The output from resistance pot R28 is fed to comparator U4C. Each comparator receives a phase control signal from filter U2C, as shown in FIG. 2A.

Comparator U4A changes state each time the input signal crosses the phase control threshold. The output from comparator U4A is fed to opto triac driver U3. The opto triac driver U3 drives the control gate of the triac. Each time comparator U4A changes state the opto triac U3 allows current to flow to the lighting circuit 22, as shown in FIG. 1. The lighting circuit 22 in FIG. 1 will have an intensity proportionate to the magnitude of energy contained in the bandpass filter U1C, as seen in FIG. 2A. The phase control signal from filter U2C allows the apparatus to display a spectrum of an audio signal 23 shown in FIG. 1 by allowing the triacs to change state at 60 CPS.

Comparator U4B changes state each time the input signal crosses the phase control threshold. The output from comparator U4B is fed to opto triac driver U5. The opto triac driver U5 drives the control gate of the triac. Each time comparator U4B changes state the opto triac U5 allows current to flow to the lighting circuit 22, as shown in FIG. 1. The lighting circuit 22 in FIG. 1 will have an intensity proportionate to the magnitude of energy contained in the bandpass filter U1D, as seen in FIG. 2A. The phase control signal from filter U2C allows the apparatus to display a spectrum of an audio signal 23 shown in FIG. 1 by allowing the triacs to change state at 60 CPS.

Comparator U4C changes state each time the input signal crosses the phase control threshold. The output from comparator U4C is fed to opto triac driver U6. The opto triac driver U6 drives the control gate of the triac. Each time comparator U4C changes state the opto triac U6 allows current to flow to the lighting circuit 22, as shown in FIG. 1. The lighting circuit 22 in FIG. 1 will have an intensity proportionate to the magnitude of energy contained in the bandpass filter U1B, as seen in FIG. 2A. The phase control signal from filter U2C allows the apparatus to display a spectrum of an audio signal 23 shown in FIG. 1 by allowing the triacs to change state at 60 CPS.

Figure 2C:
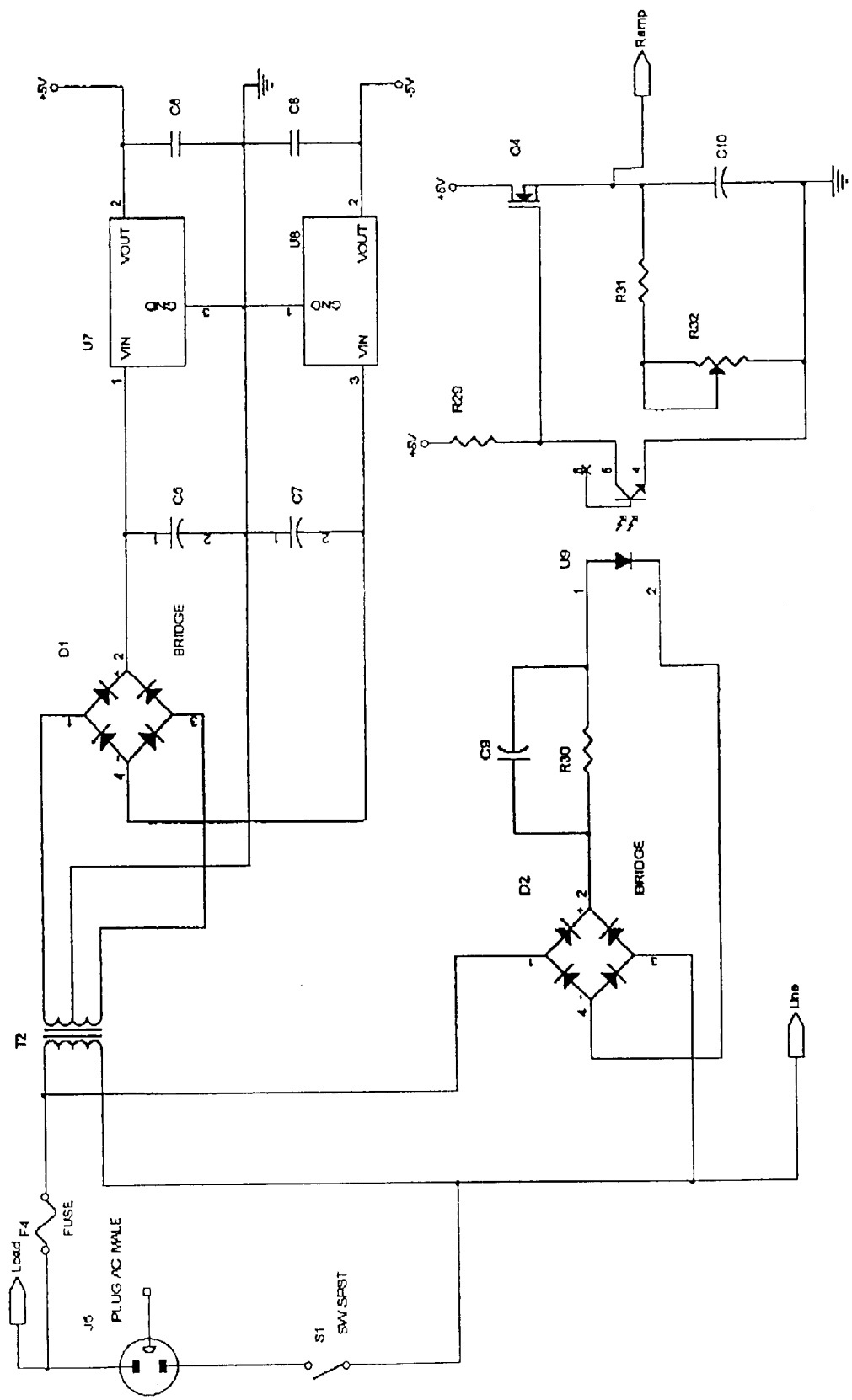
FIG. 2C is an electronic schematic of the power supply and phase control representing the preferred embodiment of the invention.

A master control is used to override the individual channel pre-established intensity levels so that all energized channels can be adjusted at the same magnitude level at the same time. As seen in FIG. 2C, bridge diode rectifier D1 and bridge diode rectifier D2 are alternate implementation of a full wave rectifier. Bridge diode rectifier D1 allows current to flow through capacitors C5 and C7 in the same direction during both positive half cycles and negative half cycles. Capacitors C5 and C7 reduce the variation of the output voltage. Bridge diode rectifier D2 allows current to flow through resistor R30 and capacitor C9 in the same direction during both positive and negative half cycles. Capacitor C9 discharging through resistor R30 reduces the output voltage variation that allows only a small drop in output voltage. The forward-biased transistor T1 along with the bridge diode rectifier D1 and D2 allows a nearly constant high voltage gain to override the individual channel pre-established intensity levels, as shown in FIG. 2B. Consequently, the master control is incorporated into the apparatus of FIG. 1 for interacting and acting as a master signal gain control and bypassing the pulsating output control network 21.

The present invention is operated through normal household 110V, AC current 11 and locating a transformer 12 to provide DC current 14 to the power supply 15, as shown in FIG. 1. The transformer 12 supplies power to power supply 15 which can be a bridge diode rectifier or equivalent circuits, and to the bridge diode rectifiers D1 and D2, as shown in FIG. 2C. As further shown in FIG. 1, a +5 to −5 VDC is taken from the power supply 15 and is distributed throughout the acoustical control apparatus as operating voltages.

Locating an external electronic audio signal 23 and power supply 15, and importing that signal and power, operates the automatic level control network 17 and provides an amplified output signal 24. Next, locating an amplified audio signal 24 and power supply 15 and importing that signal and power to a filter network 18, separates the amplified audio signal 24 into distinct bandwidth signals and provides sensitivity control. A phase control circuit 19 is located to receive power from power supply 15 and provide modulated voltage to the comparator network 20. A modulated voltage and distinct bandwidth signal are located and fed into the comparator network for feeding the triac drivers that allow voltage to pulsate. Finally, a pulsating voltage is located and sent to the output control 21 for controlling the output voltage and exporting the voltage to an output socket. Consequently, multiple strings of lights 22 will pulsate in response to an electronic audio signal 23.

It will be obvious to those having skill in the art that many changes may be made to the details of the above-described embodiments of this invention without departing from the underlying principles thereof. The scope of the present invention should, therefore, be determined only by the following claims.

What is claimed is:

1. An acoustical control apparatus for regulating output voltage flow comprising:

a power supply for providing voltages to components of said apparatus;

a level control network for receiving a voltage from said power supply and receiving an audio signal from an audio signal source and providing an amplified audio signal;

a multiple active filter network for receiving a voltage from said power supply and said amplified audio signal, for separating said amplified audio signal into a plurality of distinct bandwidths, and for providing regulated voltage flow from and in synchronization with said power supply at said distinct bandwidths;

a phase control network receiving a voltage from said power supply and providing modulated voltage;

comparators for receiving a voltage from said power supply, for receiving distinct bandwidth signals from said multiple active filter network, and for receiving modulated voltage from said phase control network, said comparators feeding triac drivers that drive control gates each time the comparators change state thereby allowing pulsating voltages; and an output control receiving a voltage from said power supply and audio signals at said plurality of distinct bandwidths from said comparators for amplifying said pulsating voltages and exporting said pulsating voltages to a plurality of output sockets.

2. The acoustic control apparatus as claimed in claim 1, wherein the level control network receives an audio signal from an audio signal source selected from the group consisting of a stereo, a television, a radio, a microphone, a boom box, a computer and a DVD player.

3. The acoustic control apparatus as claimed in claim 1, wherein the power supply consists of a transformer providing voltages of between about +5 volts DC and −5 volts DC.

4. The acoustic control apparatus as claimed in claim 1, wherein the input level of said audio signal is controlled manually.

5. The acoustic control apparatus as claimed in claim 1, wherein the apparatus is controlled automatically by a device selected from the group consisting of a digital logic device, a microprocessor, a PIC and an ASIC.

6. The acoustic control apparatus as claimed in claim 1, wherein the multiple active filter network separates the audio signal into first, second and third distinct bandwidths consisting of low, medium and high frequencies, respectively, electrically communicating with first, second and third output sockets, respectively.

7. The acoustic control apparatus as claimed in claim 6, wherein said first, second and third output sockets electrically communicate with first, second and third strings of incandescent lights, respectively.

8. The acoustic control apparatus as claimed in claim 1, wherein output voltage flow is controlled by a triac.

9. The acoustic control apparatus as claimed in claim 1, wherein said plurality of output sockets provides pulsating voltages to a plurality of incandescent lighting sources selected from the group consisting of light strands, display lighting, Christmas tree lighting, concert lighting, automobile lighting, nightclub lighting and restaurant lighting.

10. The acoustic control apparatus as claimed in claim 1, wherein the regulated voltage comprises a plurality of intensities.

11. The acoustic control apparatus as claimed in claim 1, including a master control for interacting and acting as a master signal gain control.

12. The acoustic control apparatus as claimed in claim 1, including additional control means for bypassing the pulsating control network.

13. A method of operating an acoustical control apparatus for regulating output voltage flow, comprising:

locating a level control for imputing audio signals and amplifying said signals;

locating multiple active filters for separating said amplified audio signal into distinct bandwidths and for sensitivity control;

locating a phase control for modulating voltage;

locating comparators for feeding triac drivers;

locating an output control including said triac drivers;

locating a power supply for providing operating voltages;

applying operating voltages to the level controller, multiple active filters, phase control, comparators and output control;

generating pulsating voltages with said triac drivers; and exporting said pulsating voltages to output sockets.

14. The method of operating an acoustical control apparatus as claimed in claim 13, including applying an individual control for presetting the distinct bandwidths to selected intensity levels to provide a plurality of voltage levels.

15. The method of operating an acoustical control apparatus as claimed in claim 13, including applying a master control for overriding the bandwidth signal to provide a constant voltage when an audio signal is present.

16. The method of operating an acoustical control apparatus as claimed in claim 13, including applying additional control for allowing a voltage output during the absence of an audio signal.

17. The method of operating an acoustical control apparatus as claimed in claim 13, including supplying said pulsating voltages to a plurality of incandescent lighting sources selected from the group consisting of light strands, display lighting, Christmas tree lighting, concert lighting, automobile lighting, nightclub lighting and restaurant lighting.

* * * * *